US008053528B2

(12) United States Patent
Shoemake

(10) Patent No.: US 8,053,528 B2
(45) Date of Patent: Nov. 8, 2011

(54) BINDER COMPOSITIONS FOR FIBER MATS, AND FIBER MATS AND ARTICLES COMPRISING THEM

(75) Inventor: Kelly A. Shoemake, Atlanta, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 709 days.

(21) Appl. No.: 12/119,254

(22) Filed: May 12, 2008

(65) Prior Publication Data

US 2009/0124151 A1 May 14, 2009

Related U.S. Application Data

(60) Provisional application No. 60/940,715, filed on May 30, 2007.

(51) Int. Cl.
*C08L 33/08* (2006.01)
*C09L 33/10* (2006.01)

(52) U.S. Cl. ............ 525/222; 525/55; 525/191; 525/233

(58) Field of Classification Search .................. 525/119, 525/163, 55, 191, 222, 233; 524/512, 529, 524/47
See application file for complete search history.

(56) References Cited

U.S. PATENT DOCUMENTS

| 2,906,660 | A | 9/1959 | Hungerford et al. |
|---|---|---|---|
| 3,012,929 | A | 12/1961 | Jackson |
| 3,050,427 | A | 8/1962 | Slayter et al. |
| 3,103,461 | A | 9/1963 | Smith et al. |
| 3,228,825 | A | 1/1966 | Waggoner |
| 3,760,458 | A | 9/1973 | Pitt |
| 3,766,003 | A | 10/1973 | Schuller et al. |
| 3,838,995 | A | 10/1974 | Smith |
| 3,905,067 | A | 9/1975 | Keib et al. |
| 4,238,573 | A * | 12/1980 | Hamilton ...................... 525/110 |
| 4,258,098 | A | 3/1981 | Bondoc et al. |
| 4,560,612 | A | 12/1985 | Yau et al. |
| 4,917,764 | A | 4/1990 | Lalwani et al. |
| 5,362,842 | A | 11/1994 | Graves et al. |
| 5,389,716 | A | 2/1995 | Graves et al. |
| 5,518,586 | A | 5/1996 | Mirous |
| 5,914,365 | A * | 6/1999 | Chang et al. .................. 524/512 |
| 6,001,925 | A | 12/1999 | Gapud et al. |
| 6,442,303 | B1 | 8/2002 | Meijers et al. |
| 6,642,299 | B2 | 11/2003 | Wertz et al. |
| 6,706,147 | B2 | 3/2004 | Peng et al. |
| 2003/0054714 | A1 | 3/2003 | Peng et al. |
| 2007/0059507 | A1* | 3/2007 | Xing et al. ................. 428/292.1 |

FOREIGN PATENT DOCUMENTS

| DE | 2556482 A1 | 7/1977 |
|---|---|---|
| EP | 0 575 625 A1 * | 7/1993 |
| EP | 0557819 A1 | 9/1993 |
| EP | 0575625 A1 | 12/1993 |

OTHER PUBLICATIONS

PCT International Search Report, Jul. 30, 2008.
International Preliminary Report on Patentability and Written Opinion of the International Searching Authority, Issued Dec. 1, 2009.

* cited by examiner

*Primary Examiner* — Ling Choi
(74) *Attorney, Agent, or Firm* — Michael S. Kems

(57) ABSTRACT

Aqueous binder compositions for fiber mats include a urea-formaldehyde resin and an aqueous emulsion of a copolymer prepared by polymerization of a monomer mixture including styrene, an alkyl(meth)acrylate, acrylonitrile, and an unsubstituted or substituted acrylamide. Even when used in relatively low concentration, the copolymer provides improved physical properties to the fiber mat. The fiber mats can be used in composite flooring, asphalt roofing shingles, siding, and dry wall.

22 Claims, No Drawings

BINDER COMPOSITIONS FOR FIBER MATS, AND FIBER MATS AND ARTICLES COMPRISING THEM

This application claims the benefit of the filing date of U.S. Provisional Patent Application Ser. No. 60/940,715 filed May 30, 2007, the entire contents of which are hereby incorporated by reference.

BACKGROUND OF THE INVENTION

Glass fiber mats and fiber mats made from other synthetic fibers are finding increasing application in the building materials industry, as, for example, in composite flooring, asphalt roofing shingles, siding, and dry wall. The glass fiber mats often replace mats traditionally made using wood, cellulose or asbestos fibers.

Fiber mats, and especially glass fiber mats, usually are made commercially by a wet-laid process, which is carried out on what can be viewed as modified paper making machinery. Descriptions of the wet-laid process may be found, for example, in U.S. Pat. No. 2,906,660 to Hungerford et al., U.S. Pat. No. 3,012,929 to Jackson, U.S. Pat. No. 3,050,427 to Slayter et al., U.S. Pat. No. 3,103,461 to Smith et al., U.S. Pat. No. 3,228,825 to Waggoner, U.S. Pat. No. 3,760,458 to Pitt, U.S. Pat. No. 3,766,003 to Schuller et al., U.S. Pat. No. 3,838,995 to Smith, and U.S. Pat. No. 3,905,067 to Keib et al. In general, the wet-laid process for making glass fiber mats comprises first forming an aqueous slurry of short-length glass fibers (referred to in the art as "white water") under agitation in a mixing tank, then feeding the slurry onto a moving screen on which the fibers enmesh themselves into a freshly prepared wet glass fiber mat, while excess water is separated therefrom.

Unlike natural fibers such as cellulose or asbestos, glass fibers do not disperse well in water. To overcome this problem, it has been the industry practice to provide suspending aids for the glass fibers. Such suspending aids or dispersants usually are materials that increase the viscosity of the aqueous medium. Suitable dispersants conventionally employed in the art include polyacrylamides, hydroxyethyl cellulose, ethoxylated amines and amine oxides. Other additives such as surfactants, lubricants, and defoamers also have conventionally been added to the white water. Such agents, for example, further aid the wettability and dispersion of the glass fibers. Experience has shown that such additives also often influence the strength of the wet glass fiber mat.

The fiber slurry deposited on the moving screen or cylinder is processed into a sheet-like fiber mat by the removal of water, usually by a vacuum device, and polymeric binder is then applied to the mat. In the manufacture of glass fiber mats, a high degree of flexibility and tear strength is desired in the finished mat in addition to primary dry tensile and wet tensile properties. A binder composition is therefore used to hold the glass fiber mat together. The binder composition is impregnated directly into the fibrous mat and set or cured immediately thereafter to provide the desired mat integrity. The binder composition can be applied to the mat by soaking the mat in an excess of binder solution or suspension, or by impregnating the mat surface by means of a binder applicator, for example, by roller or spray. The primary binder applicator for glass mat machines has been the falling film curtain coater. Suction devices often are also utilized for further removal of water and excess binder and to ensure a thorough application of binder through the glass fiber mat. A widely used binder is based on a urea-formaldehyde (UF) resin commonly fortified with an emulsion polymer. One advantage of urea-formaldehyde resins is that they are relatively inexpensive. In addition to mat strength properties which the binder composition imparts to the ultimately cured mat, the binder also functions to improve the strength of the uncured, wet-laid mat as it is transported from its initial formation into and through the curing oven. Such incipient pre-cured strength is needed to avoid process delays and shutdowns caused by breaks in the endless mat.

The incorporated binder is thermally cured, typically in an oven at elevated temperatures. Generally, a temperature in the range of about 200 to about 250° C. is used during curing. Normally, this heat treatment alone will effect curing of the binder. Catalytic curing, such as is accomplished with addition of an acid catalyst (for example, ammonium chloride or p-toluenesulfonic acid), generally is a less desirable, though an optional, alternative.

Because glass fiber mats made with a binder consisting essentially of a UF resin often are brittle, or because the strength properties of the mats may deteriorate appreciably subsequent to their preparation, especially when the mats are subjected to wet conditions, UF resin binders have commonly been modified by formulating the UF resin with cross-linkers and various catalyst systems or by fortifying the UF resin with a large amount of latex (emulsion) polymer, such as a poly (vinyl acetate), a poly(styrene-butadiene), a poly(styrene-maleic anhydride), a poly(styrene-maleic anhydride-acrylate), or a poly(styrene-acrylate). The use of poly(styrene-butadiene) and related copolymers in urea-formaldehyde resin compositions as a binder for glass fiber mats is disclosed, for example, in U.S. Pat. No. 4,258,098 to Bondoc et al., U.S. Pat. No. 4,560,612 to Yau, and U.S. Pat. No. 4,917,764 to Lalwani et al. The use of poly(styrene-maleic anhydride) copolymers and their hydrolyzed derivatives in urea-formaldehyde resin compositions as a binder for glass fiber mats is disclosed, for example, in U.S. Pat. No. 5,914,365 to Chang et al. The use of (1) poly(styrene-acrylic acid) or poly(styrene-acrylate), (2) poly(styrene-maleic anhydride-acrylic acid), or (3) a physical mixture of (1) and (2) in urea-formaldehyde resin compositions as a binder for glass fiber mats is disclosed in U.S. Pat. No. 6,642,299 of Wertz et al.

The addition of these polymers as a minor component of a urea-formaldehyde resin can improve both the wet and dry tensile properties of the glass mat. However, further improvements in properties are desired. Specifically, some product applications require mats having greater dry tensile strength, greater hot-wet tensile strength, greater elongation at break, greater tear strength, or a combination of two or more of these improved properties. There is also a desire to increase the productivity of methods of manufacturing the glass mats, which would require faster curing times and/or greater hot-wet tensile strength.

BRIEF DESCRIPTION OF THE INVENTION

The above-described and other drawbacks are alleviated by an aqueous binder composition for use in making fiber mats, the binder composition comprising a urea-formaldehyde resin; and an aqueous emulsion of a copolymer prepared by polymerization of a monomer mixture comprising styrene, an alkyl(meth)acrylate, acrylonitrile, and an unsubstituted or substituted acrylamide.

Another embodiment is a non-woven fiber mat, comprising: reinforcing fibers; and the cured product of a curable binder composition comprising a urea-formaldehyde resin, and an aqueous emulsion of a copolymer prepared by polymerization of a monomer mixture comprising styrene, an alkyl(meth)acrylate, acrylonitrile, and an unsubstituted or substituted acrylamide.

Another embodiment is a fiber mat faced gypsum wall board, comprising: a gypsum core having a planar first face and a planar second face; and a coated non-woven glass fiber mat facing material adhered to and covering at least one of the planar first face and the planar second face; wherein the non-woven glass fiber mat facing material comprises a coating comprising the cured product of a curable binder composition comprising a urea-formaldehyde resin, and an aqueous emulsion of a copolymer prepared by polymerization of a monomer mixture comprising styrene, an alkyl(meth)acrylate, acrylonitrile, and an unsubstituted or substituted acrylamide.

These and other embodiments are described in detail below.

DETAILED DESCRIPTION OF THE INVENTION

In the course of extensive research on polymeric additives for urea-formaldehyde-based binder compositions for fibrous mats, the present inventor has discovered that a particular class of copolymeric additive provides significant and in some cases dramatic improvements in the physical properties of the resulting glass mats. For example, improvements of 25% or more in mat tensile strength have been observed. These improvements in physical properties are accompanied by a significant decrease in required curing time. The copolymeric additive is prepared by the copolymerization of at least four different monomer types: styrene, an alkyl (meth)acrylate, acrylonitrile, and an unsubstituted or substituted acrylamide. Thus, one embodiment is an aqueous binder composition for use in making fiber mats, the binder composition comprising a urea-formaldehyde resin; and an aqueous emulsion of a copolymer prepared by polymerization of a monomer mixture comprising styrene, an alkyl(meth)acrylate, acrylonitrile, and an unsubstituted or substituted acrylamide.

The process of forming a fiber mat, and especially a glass fiber mat, begins with chopped bundles of glass fibers of suitable length and diameter for the intended application. While reference is made hereinafter to using chopped bundles of glass fibers, other fiber types, e.g., mineral fibers and synthetic fibers and other forms of fibers such as continuous strands, may also be used. Generally, fibers having a length of about ¼ inch to 3 inches and a diameter of about 3 to 20 micrometers are used for most applications. Each bundle may contain from about 20 to 500, or more, of such fibers. Suitable fibers are available commercially from Owens-Corning Fiberglass, and Johns Manville.

The glass fiber bundles are added to an aqueous dispersant medium to form an aqueous slurry, known in the art as "white water." The white water typically contains about 0.5 weight glass fibers. Any viscosity modifier or dispersant, including those commonly used in the past, can be used in the practice of the present invention including hydroxyethyl cellulose, ethoxylated amines, polyacrylamides, amine oxides and the like. Polyacrylamide and amine oxide white water systems have proven to be particularly compatible with the binder composition of the present invention. The amount of viscosity modifier used should be effective to provide the viscosity needed to suspend the glass fibers in the white water as needed to practice the method used to form the wet laid mat. The white water viscosity is generally in the range of 1 to 20 centipoise, specifically 1.5 to 8 centipoise. The fiber slurry then is agitated to form a workable, uniform dispersion of glass fibers having a suitable consistency. The viscosity modifier also may contain other conventional additives known in the art. These include dispersion aids, surfactants, lubricants, defoamers, and the like.

The fiber/water dispersion then is passed to a mat-forming machine typically containing a mat forming screen. On route to the screen, the dispersion often is diluted further with water to a lower fiber concentration. The fibers are collected at the screen in the form of a wet fiber mat and excess water is removed by gravity or, more often, by vacuum assist in a conventional manner.

The binder composition of the invention then is applied to the gravity- or vacuum-assisted dewatered wet fiber mat. Application of the binder composition may be accomplished by any conventional means, such as by soaking the mat in an excess of binder solution or suspension, or by coating the mat surface with binder by means of a binder applicator, such as a falling film or curtain coater.

The thermosetting urea-formaldehyde (UF) resin used as the major component of the binder composition of the present invention can be prepared from urea and formaldehyde monomers or from UF precondensates in manners well known to those skilled in the art. Skilled practitioners recognize that the urea and formaldehyde reactants are commercially available in many forms. Any form which can react with the other reactants and which does not introduce extraneous moieties deleterious to the desired reaction and reaction product can be used in the preparation of urea-formaldehyde resins useful in the invention. Suitable classes of UF resins include those described in U.S. Pat. No. 5,362,842 to Graves et al.

Formaldehyde for making a suitable UF resin is available in many forms. Paraformaldehyde (solid, polymerized formaldehyde) and formalin solutions (aqueous solutions of formaldehyde, sometimes with methanol, in 37 percent, 44 percent, or 50 percent formaldehyde concentrations) are commonly used forms. Formaldehyde also is available as a gas. Any of these forms is suitable for use in preparing a UF resin. Typically, formalin solutions are preferred as the formaldehyde source.

Similarly, urea is available in many forms. Solid urea, such as prill, and urea solutions, typically aqueous solutions, are commonly available. Further, urea may be combined with another moiety, most typically formaldehyde and urea-formaldehyde adducts, often in aqueous solution. Any form of urea or urea in combination with formaldehyde is suitable for use in the practice of the invention. Both urea prill and combined urea-formaldehyde products are preferred, such as Urea-Formaldehyde Concentrate or UFC 85. These types of products are described in, for example. U.S. Pat. No. 5,362,842 to Graves et al. and U.S. Pat. No. 5,389,716 to Graves.

Any of the wide variety of procedures used for reacting the principal urea and formaldehyde components to form a UF thermosetting resin composition also can be used, such as staged monomer addition, staged catalyst addition, pH control, amine modification and the like. Generally, the urea and formaldehyde are reacted at a mole ratio of formaldehyde to urea in the range of about 1.1:1 to 4:1, and more often at an F:U mole ratio of about 2.1:1 to 3.2:1. Generally, the UF resin is highly water dilutable, if not water soluble.

Many suitable thermosetting urea-form-aldehyde resins are commercially available, including those sold by Georgia Pacific Resins, Inc. for glass fiber mat applications, and those sold by Hexion and Dynea. These resins contain reactive methylol groups that upon curing form methylene or ether linkages. Such methylol-containing urea adducts may include N,N'-dimethylol, dihydroxymethylolethylene, N,N'- bis(methoxymethyl), N,N'-dimethylolpropylene, 5,5-dimethyl-N,N'-dimethylolethylene, N,N'-dimethylolethylene, and the like.

Urea-formaldehyde resins useful in the practice of the invention generally contain 45 to 70 weight percent non-volatiles, specifically 55 to 65 weight percent non-volatiles. They generally have a viscosity of 50 to 600 centipoise, specifically 150 to 400 centipoise. They normally exhibit a pH of 7.0 to 9.0, specifically 7.5 to 8.5. And they often have a free formaldehyde level of not more than about 3.0%, and a water dilutability of 1:1 to 100:1, specifically 5:1 and above.

The reactants for making the UF resin can, optionally, further include a small amount of a resin modifier such as ammonia, an alkanolamine, or a polyamine such as an alkyl primary diamine (e.g., ethylenediamine (EDA)). Additional modifiers, such as melamine, ethylene ureas, and primary and secondary and tertiary amines, for example, dicyanodiamide, can also be incorporated into the binder composition. Concentrations of these modifiers, when present in the reaction mixture, can be 0.05 to 20 weight percent, based on the total resin solids. These types of modifiers promote hydrolysis resistance, polymer flexibility and lower formaldehyde emissions in the cured resin.

The second component of the aqueous binder composition of this invention is an aqueous emulsion of a copolymer prepared by polymerization of a monomer mixture comprising styrene, an alkyl(meth)acrylate, acrylonitrile, and an unsubstituted or substituted acrylamide. For brevity, the resulting copolymer is sometimes referred to as "the copolymeric additive".

The monomer mixture used to prepare the copolymeric additive includes styrene. Substituted styrenes, such as alpha-methylstyrene, 4-methylstyrene, and 4-t-butylstyrene can also be used.

In addition to styrene, the monomer mixture comprises an alkyl (meth)acrylate. As used herein, the fragment "(meth)acryl-" means "acryl-" or "methacryl-". In some embodiments, the alkyl(meth)acrylate is a $C_1$-$C_6$ alkyl (meth)acrylate, such as methyl acrylate, ethyl acrylate, n-propyl acrylate, i-propyl acrylate, n-butyl acrylate, i-butyl acrylate, sec-butyl acrylate, t-butyl acrylate, n-pentyl acrylate, n-hexyl acrylate, the corresponding methacrylates of the foregoing acrylates, and the like, and mixtures thereof. In some embodiments, the alkyl(meth)acrylate comprises butyl acrylate. In some embodiments, the alkyl(meth)acrylate comprises ethyl acrylate.

In addition to styrene and an alkyl(meth)acrylate, the monomer mixture comprises acrylonitrile and an unsubstituted or substituted acrylamide. Suitable unsubstituted or substituted acrylamides include, for example, acrylamide, methacrylamide, N-methylolacrylamide, N-methylolmethacrylamide, and mixtures thereof. In some embodiments, the unsubstituted or substituted acrylamide comprises acrylamide and N-methylolacrylamide.

Each of the required components of the monomer mixture is typically present in an amount of at least 1 weight percent, based on the total weight of the monomer mixture. Particularly good properties in the glass mat have been observed when the copolymeric additive is prepared from a monomer mixture comprising about 20 to about 60 weight percent styrene, about 20 to about 50 weight percent of the alkyl (meth)acrylate, about 5 to about 30 weight percent acrylonitrile, and about 1 to about 15 weight percent of the unsubstituted or substituted acrylamide, wherein all weight percents are based on the total weight of the monomer composition.

The monomer mixture can, optionally, include monomers in addition to styrene, an alkyl(meth)acrylate, acrylonitrile, and an unsubstituted or substituted acrylamide. For example, in some embodiments, the monomer mixture further comprises a silane monomer comprising at least one polymerizable carbon-carbon double bond and at least one hydrolyzable group. Polymerizable carbon-carbon double bonds include those present in vinyl groups, allyl groups, (meth) acryl groups, and the like. Hydrolyzable groups include chlorine atoms bound to silicon, alkoxide groups bound to silicon, and the like. Specific silane monomers include, for example, gamma-methacryloxypropyltriethoxysilane, beta-methacryloxyethyltrimethoxysilane, beta-methacryloxyethyltriethoxysilane, beta-methacryloxyethylmethyidimethoxysilane, beta-methacryloxyethylmethyidiethoxysilane, beta-methacryloxyethyldimethylmethoxysilane, beta-methacryloxyethyldimethlyethoxysilane, beta-methacryloxyethyltrichlorosilane, gamma-methacryloxypropyltrimethoxysilane, gamma-methacryloxypropylmethyldimethoxysilane, gamma-methacryloxypropylmethyldiethoxysilane, gamma-methacryloxypropyldimethylmethoxysilane, gamma-methacryloxypropyldimethylethoxysilane, beta-acryloxyethyltrimethoxysilane, beta-acryloxyethyltriethoxysilane, beta-acryloxyethylmethyidimethoxysilane, beta-acryloxyethylmethyidiethoxysilane, beta-acryloxyethyldimethylmethoxysilane, beta-acryloxyethyldimethylethoxysilane, beta-acryloxyethyltrichlorosilane, gamma-acryloxypropyltrimethoxysilane, gamma-acryloxypropylmethyldimeoxysilane, gamma-acryloxypropylmethyldiethoxysilane, gamma-acryloxypropyldimethylmethoxysilane, gamma-acryloxypropyldimethylethoxysilane, beta-styrylethyltrimethoxysilane, vinyltriacetoxysilane, vinylethoxydimethoxysilane, vinylmethyldimethoxysilane, vinylmethyldiethoxysilane, vinyltris(2-methoxyethoxy)silane, and mixtures thereof. In some embodiments, the silane monomer comprises gamma-methacryloxypropyltriethoxysilane. When present in the monomer mixture, the silane monomer can be used in an amount of about 0.1 to about 10 weight percent, specifically about 0.2 to about 5 weight percent, based on the total weight of the monomer mixture.

The monomer mixture may, optionally, further comprise poly(vinyl alcohol). As used herein, the term poly(vinyl alcohol) includes homopolymers of vinyl alcohol, as well as partially and fully hydrolyzed poly(vinyl acetate)s. Although the poly(vinyl alcohol) is not a polymerizable monomer in the sense of comprising a polymerizable carbon-carbon double bond, it can be incorporated into the copolymer as a block or, more likely, a graft by reaction of a hydroxy group of the poly(vinyl alcohol) with a hydrolyzable or esterifiable group in the existing copolymer. For example, a hydroxy group of the poly(vinyl alcohol) can react with an ethoxy group of a triethoxysilyl moiety in the copolymer to produce water and a poly(vinyl alcohol) chain (graft) covalently bound to the copolymer chain via a silicon atom. Given the numerous hydroxy groups on a given poly(vinyl alcohol) molecule, the poly(vinyl alcohol) can also function as a crosslinking agent between two or more copolymer chains. The poly(vinyl alcohol) may be added to the reaction mixture during the initial reactor charge, as part of subsequent monomer feed, or as a post-addition after polymerization has been completed. When present in the monomer mixture, the poly(vinyl alcohol) can be used in an amount of about 0.5 to about 20 weight percent, specifically about 1 to about 15 weight percent, more specifically about 2 to about 10 weight percent, based on the total weight of the monomer mixture.

The monomer mixture may, optionally, further comprise starch. As used herein, the term starch refers to natural and synthetic mixtures of amylose and amylopectin, as well as derivatives thereof. In some embodiments, the starch is corn starch. Like poly(vinyl alcohol), starch is not a polymerizable monomer in the sense of comprising a polymerizable carbon-carbon double bond. However, like poly(vinyl alcohol), starch can be incorporated into the copolymer as a block or, more likely, a graft by reaction of a hydroxy group of the starch with a hydrolyzable or esterifiable group in the existing copolymer. Also like poly(vinyl alcohol), starch can function as a crosslinking agent between two or more copolymer chains. The starch may be added to the reaction mixture during the initial reactor charge, as part of subsequent monomer feed, or as a post-addition after polymerization has been completed. When present in the monomer mixture, starch can be used in an amount of about 0.5 to about 30 weight percent, specifically about 1 to about 20 weight percent, more specifically about 2 to about 10 weight percent, based on the total weight of the monomer, mixture.

The monomer mixture may, optionally, further comprise a crosslinking monomer comprising at least two polymerizable carbon-carbon double bonds. The polymerizable carbon-carbon double bonds of the crosslinking monomer are generally aliphatic carbon-carbon double bonds and can be, for example, vinyl groups, allyl groups, (meth)acryl groups, or a combination thereof. Specific crosslinking monomers include, for example, poly((meth)acryl) compounds such as methylenebis((meth)acrylamide), 1,6-hexamethylenebis ((meth)acrylamide), diethylenetriamine tris((meth)acrylamide), bis(gamma-((meth)acrylamide) propoxy)ethane, beta-((meth)acrylamide)ethyl acrylate, ethylene glycol di((meth)acrylate)), diethylene glycol di(meth)acrylate, tetraethylene glycol di(meth)acrylateglycerol di(meth)acrylate, glycerol tri(meth)acrylate, 1,3-propylene glycol di(meth)acrylate, dipropyleneglycol di(meth)acrylate, 1,4-butanediol di(meth)acrylate, 1,2,4-butanetriol tri(meth)acrylate, 1,6-hexanedioldi(meth)acrylate, 1,4-cyclohexanediol di(meth)acrylate, 1,4-benzenediol di(meth)acrylate, pentaerythritoltetra(meth)acrylate, 1,5-pentanediol di(meth)acrylate, trimethylolpropane di(meth)acrylate, trimethylolpropane tri(meth)acrylate), 1,3,5-triacryloylhexahydro-1,3,5-triazine, 2,2-bis(4-(2-(meth)acryloxyethoxy)phenyl)propane, 2,2-bis (4-(2-(meth)acryloxyethoxy)-3,5-dibromophenyl)propane, 2,2-bis((4-(meth)acryloxy)phenyl)propane, 2,2-bis((4-(meth)acryloxy)-3,5-dibromophenyl)propane, and the like, and mixtures thereof; polyvinyl compounds such as divinylbenizenes, trivinylbenzenes, diisopropenylbenzenes, and the like, and mixtures thereof, polyallyl compounds such as diallylbenzenes, triallylbenzenes, triallyl cyanurate, and triallylisocyanurate, and the like, and mixtures thereof, and combinations thereof. When present in the monomer mixture, the crosslinking monomer may be used in an amount of about 0.1 to about 5 weight percent, specifically about 0.3 to about 3 weight percent, more specifically about 0.5 to about 2 weight percent, based on the total weight of the monomer mixture.

Certain specific monomer mixtures have been found to produce particularly effective copolymeric additives. For example, in some embodiments, the monomer mixture comprises about 30 to about 60 weight percent styrene, about 20 to about 40 weight percent butyl acrylate, about 10 to about 25 weight percent acrylonitrile, 0.5 to about 4 weight percent acrylamide, about 1 to about 6 weight percent N-methylolacrylamide, about 0.1 to about 3 weight percent itaconic acid, about 0.1 to about 3 weight percent gamma-methacryloxypropyltriethoxysilane, and about 0.2 to about 4 weight of a crosslinking monomer. As another example, in some embodiments, the monomer mixture comprises about 30 to about 60 weight percent styrene, about 20 to about 40 weight percent butyl acrylate, about 10 to about 25 weight percent acrylonitrile, 0.5 to about 4 weight percent acrylamide, about 1 to about 6 weight percent N-methylolacrylamide, about 0.1 to about 3 weight percent itaconic acid, about 0.1 to about 3 weight percent gamma-methacryloxypropyltriethoxysilane, about 0.2 to about 4 weight of a crosslinking monomer, and about 5 to about 20 weight percent poly(vinyl alcohol). As yet another example, in some embodiments, the monomer mixture comprises about 40 to about 60 weight percent ethyl acrylate, about 20 to about 40 weight percent styrene, about 5 to about 20 weight percent acrylonitrile, about 0.2 to about 3 weight percent acrylamide, about 1 to about 6 weight percent N-methylolacrylamide, about 0.1 to about 3 weight percent itaconic acid, about 0.2 to about 4 weight of a crosslinking monomer, and about 5 to about 20 weight percent starch.

The monomer mixture can, optionally, exclude monomers or polymers other than those described above as required or optional. For example, in some embodiments, the monomer mixture is free of maleic anhydride. As another example, in some embodiments, the monomer mixture is free of butadiene.

The monomer mixture comprising styrene, an alkyl(meth)acrylate, acrylonitrile, and an unsubstituted or substituted acrylamide may be polymerized using polymerization methods known in the art. A particularly useful polymerization method is emulsion polymerization using a so-called redox catalyst comprising a reducing agent, such as sodium metabisulfite or sodium hydrosulfite, and an oxidizing agent, such as sodium persulfate or ammonium persulfate or hydrogen peroxide. The monomer composition may be added to the polymerization reaction mixture over time (for example, over the course of several hours). The copolymer resulting from polymerization of the monomer mixture can comprise a random copolymer backbone and, optionally, poly(vinyl alcohol) and/or starch grafts or crosslinks. The weight average molecular weight of the copolymer can be about 5,000 to about 1,000,000 atomic mass units, specifically about 50,000 to about 500,000 atomic mass units.

The aqueous binder composition can, optionally, include other polymers in addition to the copolymeric additive. For example, in some embodiments the aqueous binder comprises poly(styrene-maleic anhydride). It will be understood that the term poly(styrene-maleic anhydride) refers to the polymerization product of monomers consisting of styrene and maleic anhydride; the anhydride moieties of the poly (styrene-maleic anhydride) may be unhydrolyzed, partially hydrolyzed, or fully hydrolyzed. When present in the aqueous binder composition, the poly(styrene-maleic anhydride) may be used in an amount of about 1 to about 20 weight percent, based on the total solids content of the aqueous binder composition. In some embodiments, the aqueous binder composition is free of poly(styrene-maleic anhydride).

To prepare the aqueous binder, the aqueous thermosetting UF resin solution and the aqueous emulsion of the copolymeric additive are simply mixed in a desired proportion under ambient conditions. In order to insure suitable storage stability of the modified binder composition and proper performance during use of the binder composition, the pH of the aqueous mixture is typically about 6 to 9, and more specifically about 7 and 8.5. Too low a pH causes premature curing of the UF resin and incompatibility of the UF resin with the copolymeric additive; too high a pH can retard curing of the composition on heating during use. Suitable binders can be prepared by mixing the UF resin and the copolymeric additive, on a solids basis, in a UF:additive weight ratio of about 99.9:0.1 to about 70:30, specifically about 99.8:0.2 to about 80:20.

The total concentration of non-volatile components in the aqueous binder composition can vary widely, but it will usually be found convenient and satisfactory to make up this composition at total solids concentration of about 5 to about 40 weight percent, specifically about 20 to about 35 weight percent, based on the total weight of the aqueous binder composition. As used herein, the solids content of a composition is measured by the weight loss upon heating a small (for example, a 1-5 gram) sample of the composition at about 105° C. for about 3 hours. The binder composition may also contain a variety of other known additives such as a silica colloid to enhance fire resistance, antifoamers, biocides, pigments, and the like, normally in small proportions relative to the essential UF resin and polymer additive constituents.

The amount of binder composition applied to the mat also can vary considerably, but loadings are typically about 3 to about 45 percent by weight, specifically about 10 to about 40 percent by weight, more specifically about 15 to about 30 percent by weight, of nonvolatile binder composition based on the dry weight of the bonded mat. For inorganic fibrous mats, this value can normally be confirmed by measuring the percent loss on ignition (LOI) of the fiber mat product.

The binder composition of this invention can be employed with any fibers that can be formed into mats in any suitable manner. The fibers may be organic or inorganic. In some embodiments, inorganic fibers are used. Inorganic fibers include, for example, glass fibers, mineral fibers, graphite fibers, metal fibers, metal coated glass fibers, and metal coated graphite fibers. In some embodiments, organic fibers are used. Organic fibers include, for example, polyacrylic fibers, aromatic polyamide fibers, polyester fibers, cellulosic fibers including cellulose fibers, and polyolefin fibers. The fibers generally comprise from about 50 to about 97 percent by weight of solids, in the mat on a dry weight basis.

The binder composition of the invention sets or cures at elevated temperatures below the decomposition temperature of the UF resin and SMA copolymer components. The setting or curing of the binder composition can occur at temperatures of about 135 to about 300° C., specifically about 135 to about 275° C. At these temperatures, the binder composition will typically cure in a period of about 2 to about 60 seconds. Although the binder composition may cure more rapidly at higher temperatures, excessively high temperatures can cause deterioration of the binder composition or the fibers of the mat, which in turn causes a deterioration of the bonded mat physical and functional properties.

Following application of the aqueous binder composition to the wet laid mat, the glass fiber mat is dewatered, normally under vacuum, to remove excess binder solution. The mat then is dried and the incorporated binder composition is cured in an oven at elevated temperatures, generally at a temperature of at least about 170° C., specifically about 200 to about 250° C., for a time sufficient to cure the resin. The amount of time needed to cure the resin is readily determinable by the skilled practitioner. Heat treatment alone is sufficient to effect curing. Alternatively, but generally less desirable, catalytic curing in the absence of heat may be used, such as is accomplished upon the addition of an acid catalyst, such as ammonium chloride or p-toluenesulfonic acid.

When the filler is glass fibers, the finished glass mat product generally contains about 60 to about 90 weight percent glass fibers and about 10 to about 40 weight percent, specifically about 15 to about 30 weight percent, of cured binder.

As described above, the aqueous binder composition is useful for producing non-woven fiber mats. Thus, one embodiment is a non-woven fiber mat, comprising: reinforcing fibers; and the cured product of a curable binder composition comprising a urea-formaldehyde resin, and an aqueous emulsion of a copolymer prepared by polymerization of a monomer mixture comprising styrene, an alkyl (meth)acrylate, acrylonitrile, and an unsubstituted or substituted acrylamide. Various inorganic or organic fibers can be used as the reinforcing fibers. In some embodiments, the reinforcing fibers are glass fibers.

The non-woven fiber mats can be used by themselves or incorporated into a variety of articles, including composite flooring, asphalt roofing shingles, siding, and dry wall. Methods of incorporating fiber mats into such articles are known in the art. When the reinforcing fibers are glass fibers, the non-woven fiber maters are particularly useful as facing materials for gypsum wall board. Thus, one embodiment is a fiber mat faced gypsum wall board, comprising: a gypsum core having a planar first face and a planar second face; and a coated non-woven glass fiber mat facing material adhered to and covering at least one of the planar first face and the planar second face; wherein the non-woven glass fiber mat facing material comprises a coating comprising the cured product of a curable binder composition comprising a urea-formaldehyde resin, and an aqueous emulsion of a copolymer prepared by polymerization of a monomer mixture comprising styrene, an alkyl(meth)acrylate, acrylonitrile, and an unsubstituted or substituted acrylamide.

The invention is further illustrated by the following non-limiting examples.

EXAMPLES 1-4, COMPARATIVE EXAMPLES 1-5

These examples illustrate the preparation of glass mats using binder compositions comprising a urea-formaldehyde resin and various polymeric additives.

Wet glass fiber mats were prepared as described above using glass Fibers obtained as JM 137 from Johns Manville.

The base resin for the binder compositions was a urea-formaldehyde resin obtained from Georgia-Pacific. In Comparative Example 1, this base resin was modified with a hydrolyzed poly(styrene-maleic anhydride) copolymer (SMA); the UF resin with SMA was obtained from Georgia-Pacific. All other compositions were prepared by mixing the SMA-free urea-formaldehyde resin with an emulsion of the specified polymer additive.

A 54% aqueous emulsion of a vinyl acrylic resin was obtained as Latex F-864 from Franklin International. A 50% aqueous emulsion of a poly(vinyl acetate) was obtained as VINAC 828M from Air Products and Chemicals. A 50% aqueous emulsion of a carboxylated styrene butadiene copolymer was obtained as SBR 6620 from Dow Chemical. An aqueous emulsion of 100 parts by weight an epoxy resin and 20 parts by weight starch was obtained as RD-H16A from Para-Chem. A 45% aqueous emulsion having a pH of about 7 and including a copolymer produced by emulsion polymerization of a monomer mixture comprising 27 parts by weight styrene, 47 parts by weight ethyl acrylate, 11 parts by weight acrylonitrile, 3.3 parts by weight N-methylolacrylamide, 0.6 parts by weight acrylamide, 0.4 parts by weight itaconic acid, 0.9 parts by weight polyfunctional (crosslinking) monomer, and 9.8 parts by weight starch was obtained as RD-H116B from Para-Chem. An aqueous emulsion of a copolymer produced by emulsion polymerization of a monomer mixture comprising 39.1 parts by weight styrene, 36.6 parts by weight butyl acrylate, 17.9 parts by weight acrylonitrile, 3.5 parts by weight N-methylolacrylamide, 0.5 parts by weight itaconic acid, 1.4 parts by weight acrylamide, 1.0 part by weight polyfunctional (crosslinking) monomer, and 2 parts by weight vinyl alcohol was obtained as RD-H16C from Para-Chem. An aqueous emulsion of a copolymer produced by emulsion polymerization of a monomer mixture comprising 45.6 parts by weight styrene, 31.1 parts by weight butyl acrylate, 17.2 parts by weight acrylonitrile, 0.5 parts by weight itaconic acid, 1.4 parts by weight acrylamide, 0.9 parts by weight polyfunctional (crosslinking) monomer, and 2 parts by weight of a wet adhesion monomer (sold as C4 by Cytec) was obtained as RD-H16D from Para-Chem. An aqueous emulsion of a copolymer produced by emulsion polymerization of a monomer mixture comprising 45.6 parts by weight styrene, 31.1 parts by weight butyl acrylate, 17.2 parts by weight acrylonitrile, 3.3 parts by weight N-methylolacrylamide, 0.5 parts by weight itaconic acid, 1.4 parts by weight acrylamide, 0.9 parts by weight polyfunctional (crosslinking) monomer, and 2 parts by weight gamma-methacryloxypropyltriethoxysilane was obtained as RD-H16E from Para-Chem.

Table 1 summarizes the components and amounts for all compositions. Polymer emulsion and water amounts were adjusted to produce a binder composition containing 23 weight percent solids, with the polymer additive constituting 15 weight percent of the total solids. Mats were cured for 25, 30, 40, 45, and 60 seconds at 205° C. Following the cure, strength and other properties of the consolidated mats were measured.

Three handsheets (28 centimeters×28 centimeters: 11 inches×11 inches) were prepared from each composition. The sheets had an average weight basis of 8.93 kilograms per 100 square meters (1.83 pounds per 100 square feet). The dry and wet tensile strengths of each sheet were determined using a Thwing-Albeit tensile tester with a 0-200 kilogram load cell. Tensile strengths are expressed in units of pounds per 3 inches (lb/3 in). Elmendorf tear strength was determined using a Thwing-Albert Pro Tear with a 3200 gram pendulum. Tear strengths are expressed in units of gram-force (gf). Percent loss on ignition (% LOI) was determined by weighing samples after 30 minutes at 600° F. Percent hot-wet retention is the percentage of dry tensile strength retained after immersing the sample in 80° C. water for 10 minutes. Equalized tensile number (ETN) was calculated according to the formula ETN=(dry tensile strength×% hot wet retention)/(LOI×basis weight).

The results, presented in Table 1, show that glass sheets incorporating the cured binder compositions of Examples 1-4 all show some property improvement relative to the sheet incorporating the cured, SMA-containing binder composition of Comparative Example 1. Specifically, the Example 1 binder composition comprising a copolymer of acrylamide, acrylonitrile, ethyl acrylate, itaconic acid, N-methylolacrylamide, styrene, crosslinking monomer, and starch, exhibited markedly improved dry tensile strength and elongation and equalized tensile number, as well as improved percent hot-wet retention. The Example 2 binder composition comprising a copolymer of acrylamide, acrylonitrile, butyl acrylate, itaconic acid, N-methylolacrylamide, styrene, crosslinking monomer, and poly(vinyl alcohol), exhibited improved dry tensile strength, elongation, and equalized tensile number. The Example 3 binder composition comprising a copolymer of acrylamide, acrylonitrile, butyl acrylate, itaconic acid, N-methylolacrylamide, styrene, crosslinking monomer, and wet adhesion monomer exhibited improved percent hot-wet retention and equalized tensile number. And the Example 4 binder composition comprising a copolymer of acrylamide, acrylonitrile, butyl acrylate, itaconic acid, gamma-methacryloxypropyltriethoxysilane, N-methylolacrylamide, styrene, and crosslinking monomer exhibited improved dry tensile strength and tear strength. The advantages exhibited for Examples 1-4 were all achieved at reduced cure times of 25-45 seconds, compared to 60 seconds for Comparative Example 1.

TABLE 1

| | C. Ex. 1 | C. Ex. 2 | C. Ex. 3 | C. Ex. 4 | C. Ex. 5 |
|---|---|---|---|---|---|
| BINDER COMPONENTS AND CURE TIME | | | | | |
| Base Resin | 608 | 608 | 608 | 608 | 608 |
| SMA | 65* | 0 | 0 | 0 | 0 |
| Latex F-864 | 0 | 121 | 0 | 0 | 0 |
| VINAC 828M | 0 | 0 | 138 | 0 | 0 |
| SBR 6620 | 0 | 0 | 0 | 131 | 0 |
| RDH-16A | 0 | 0 | 0 | 0 | 156 |
| RDH-16B | 0 | 0 | 0 | 0 | 0 |
| RDH-16C | 0 | 0 | 0 | 0 | 0 |
| RDH-16D | 0 | 0 | 0 | 0 | 0 |
| RDH-16E | 0 | 0 | 0 | 0 | 0 |
| Water | 1183 | 1169 | 1152 | 1160 | 1135 |
| pH before adjustment | 7.75 | 6.93 | 7.39 | 7.54 | 7.43 |
| Sodium hydroxide | 0 | 0.45 | 0.05 | 0 | 0.07 |
| pH after adjustment | 7.75 | 7.59 | 7.50 | 7.54 | 7.53 |
| Cure time (seconds) | 60 | 60 | 45 | 45 | 45 |
| PROPERTIES | | | | | |
| Dry Tensile Strength (lb/3 in) | 89 | 78 | 87 | 85 | 86 |
| Elongation (%) | 3.78 | 3.77 | 4.28 | 4.06 | 3.89 |
| Basis weight | 1.80 | 1.86 | 1.84 | 1.87 | 1.98 |
| Elmendorf tear strength (gf) | 536 | 480 | 544 | 450 | 480 |
| % LOI | 23.2 | 22.4 | 21.7 | 23.7 | 22.3 |
| % Hot-Wet Retention | 76.6 | 83.8 | 78.2 | 77.2 | 76.0 |
| ETN | 163 | 158 | 172 | 149 | 148 |

| | Ex. 1 | Ex. 2 | Ex. 3 | Ex. 4 |
|---|---|---|---|---|
| BINDER COMPONENTS AND CURE TIME | | | | |
| Base Resin | 608 | 608 | 608 | 608 |
| SMA | 0 | 0 | 0 | 0 |
| Latex F-864 | 0 | 0 | 0 | 0 |
| VINAC 828M | 0 | 0 | 0 | 0 |
| SBR 6620 | 0 | 0 | 0 | 0 |
| RDH-16A | 0 | 0 | 0 | 0 |
| RDH-16B | 145 | 0 | 0 | 0 |
| RDH-16C | 0 | 139 | 0 | 0 |
| RDH-16D | 0 | 0 | 136 | 0 |
| RDH-16E | 0 | 0 | 0 | 136 |
| Water | 1183 | 1169 | 1152 | 1160 |
| pH before adjustment | 7.60 | 7.47 | 7.61 | 7.58 |
| Sodium hydroxide | 0.0 | 0.1 | 0.0 | 0.0 |
| pH after adjustment | 7.60 | 7.67 | 7.61 | 7.58 |
| Cure time (seconds) | 45 | 30 | 25 | 40 |
| PROPERTIES | | | | |
| Dry Tensile Strength (lb/3 in) | 106 | 104 | 79 | 92 |
| Elongation (%) | 4.84 | 4.15 | 3.44 | 3.80 |
| Basis weight | 1.77 | 1.81 | 1.80 | 1.85 |
| Elmendorf tear strength (gf) | 469 | 423 | 461 | 554 |
| % LOI | 21.5 | 21.9 | 22.0 | 23.8 |
| % Hot-Wet Retention | 83.2 | 76.6 | 85.2 | 55.8 |
| ETN | 231 | 201 | 170 | 116 |

*dry weight equivalent

EXAMPLES 5-8, COMPARATIVE EXAMPLES 6-8

These examples illustrate the evaluation of additional polymeric additives. The base resin and wet glass mat were the same as those used in Example 1. Comparative Examples 6 and 8 are replicates of each other, and Comparative Example 7 is the same as Comparative Examples 6 and 8 except that the cure time is 55 seconds instead of 60 seconds. An aqueous emulsion including a copolymer produced by emulsion polymerization of a monomer mixture comprising 40.4 parts by weight styrene, 27.4 parts by weight butyl acrylate, 16.1 parts by weight acrylonitrile, 3.1 parts by weight N-methylolacrylamide, 1.4 parts by weight acrylamide, 0.4 parts by weight itaconic acid, 0.8 parts by weight polyfunctional (crosslinking) monomer, parts by weight gamma-methacryloxypropyltriethoxysilane, and 10.0 parts by weight starch was obtained as BF-L31 from Para-Chem. An aqueous emulsion having 52% solids and a pH of 8.5 and including a copolymer produced by emulsion polymerization of a monomer mixture comprising 44.9 parts by weight styrene, 30.4 parts by weight butyl acrylate, 17.9 parts by weight acrylonitrile, 3.4 parts by weight N-methylolacrylamide, 1.6 parts by weight acrylamide, 0.5 parts by weight itaconic acid, 0.9 parts by weight polyfunctional (crosslinking) monomer, and 0.4 parts by weight gamma-methacryloxypropyltriethoxysilane, was obtained as BF-L32 from Para-Chem. An aqueous emulsion including a copolymer produced by emulsion polymerization of a monomer mixture comprising 40.4 parts by weight styrene, 27.4 parts by weight butyl acrylate, 16.1 parts by weight acrylonitrile, 3.1 parts by weight N-methylolacrylamide, 1.4 parts by weight acrylamide, 0.4 parts by weight itaconic acid, 0.8 parts by weight polyfunctional (crosslinking) monomer, 0.4 parts by weight gamma-methacryloxypropyltriethoxysilane, and 20.0 parts by weight starch was obtained as BF-L35 from Para-Chem. An aqueous emulsion including a copolymer produced by emulsion polymerization of a monomer mixture comprising 40.4 parts by weight styrene, 27.4 parts by weight butyl acrylate, 16.1 parts by weight acrylonitrile, 3.1 parts by weight N-methylolacrylamide, 1.4 parts by weight acrylamide, 0.4 parts by weight itaconic acid, 0.8 parts by weight polyfunctional (crosslinking) monomer, 0.4 parts by weight gamma-methacryloxypropyltriethoxysilane, and 10.0 parts by weight poly(vinyl alcohol) was obtained as BF-L38 from Para-Chem. All binder compositions were adjusted to a pH value in the range 7.5-7.8 before use.

Samples were prepared and tested as described for Example 1. Compositions and results are presented in Table 2. The results show that all inventive compositions exhibit multiple advantages relative to Comparative Example 6 with an SMA additive. Specifically, the Example 5 composition comprising a copolymer of acrylamide, acrylonitrile, butyl acrylate, itaconic acid, gamma-methacryloxypropyltriethoxysilane, N-methylolacrylamide, styrene, crosslinking monomer, and starch exhibited improved dry tensile strength and elongation, and markedly improved tear strength, percent hot-wet retention, and equalized tensile number. The Example 6 composition comprising a copolymer of acrylamide, acrylonitrile, butyl acrylate, itaconic acid, gamma-methacryloxypropyltriethoxysilane, N-methylolacrylamide, styrene, and crosslinking monomer exhibited improved elongation, and markedly improved tear strength, percent hot-wet retention, and equalized tensile number. The Example 7 composition comprising a copolymer of acrylamide, acrylonitrile, butyl, acrylate, itaconic acid, gamma-methacryloxypropyltriethoxysilane, N-methylolacrylamide, styrene, crosslinking monomer, and starch exhibited improved percent hot-wet retention and markedly improved tear strength. The Example 8 composition comprising a copolymer of acrylamide, acrylonitrile, butyl acrylate, itaconic acid, gamma-methacryloxypropyltriethoxysilane, N-methylolacrylamide, styrene, crosslinking monomer, and poly(vinyl alcohol) exhibited markedly improved tear strength and equalized tensile number. The property advantages of Examples 5-8 were achieved at reduced cure times of 35-40 seconds, compared to 60 seconds for Comparative Example 1.

TABLE 2

| | C. Ex. 6 | Ex. 5 | Ex. 6 | Ex. 7 | Ex. 8 |
|---|---|---|---|---|---|
| POLYMER ADDITIVE AND CURE TIME | | | | | |
| Polymer additive | SMA | BF-L31 | BF-L32 | BF-L35 | BF-L38 |
| Cure time (seconds) | 60 | 35 | 40 | 35 | 40 |
| PROPERTIES | | | | | |
| Dry Tensile Strength (lb/3 in) | 119.6 | 124.0 | 120.0 | 116.2 | 114.5 |
| Elongation (%) | 4.02 | 4.12 | 4.31 | 3.94 | 3.76 |
| Basis weight | 1.8 | 1.8 | 1.7 | 1.8 | 1.8 |
| Elmendorf tear strength (gf) | 513 | 612 | 651 | 582 | 629 |
| % LOI | 21.3 | 22.3 | 20.9 | 21.7 | 22.0 |
| % Hot-Wet Retention | 60.1 | 69.5 | 71.9 | 62.7 | 78.7 |
| ETN | 192.5 | 212.6 | 241.1 | 188.7 | 227.8 |

| | C. Ex. 7 | C. Ex. 8 |
|---|---|---|
| POLYMER ADDITIVE AND CURE TIME | | |
| Polymer additive | SMA | SMA |
| Cure time (seconds) | 55 | 60 |
| PROPERTIES | | |
| Dry Tensile Strength (lb/3 in) | 102.6 | 106.2 |
| Elongation (%) | 3.73 | 3.62 |
| Basis weight | 1.8 | 1.9 |
| Elmendorf tear strength (gf) | 585 | 484 |
| % LOI | 22.4 | 23.1 |
| % Hot-Wet Retention | 64.7 | 77.6 |
| ETN | 162.1 | 189.0 |

EXAMPLES 9-16, COMPARATIVE EXAMPLES 9 AND 10

These examples illustrate the effect of cure time on the properties of compositions comprising the BF-L32 and BF-L38 additives described above.

Samples were prepared and tested as described for Example 1. Compositions and results are presented in Table 3. The results show that, relative to Comparative Example 9 with SMA as polymer additive, the Example 9-16 compositions incorporating the BF-L32 and BF-L38 additives exhibit faster curing, markedly improved tensile strengths and equalized tensile numbers, improved percent hot-wet retention, and, in many instances, improved elongation, while maintaining comparable tear strengths.

TABLE 3

| | C. Ex. 9 | Ex. 9 | Ex. 10 | Ex. 11 | Ex. 12 |
|---|---|---|---|---|---|
| POLYMER ADDITIVE AND CURE TIME | | | | | |
| Polymer additive | SMA | BF-L32 | BF-L32 | BF-L32 | BF-L32 |
| Cure time (seconds) | 60 | 35 | 40 | 45 | 50 |
| PROPERTIES | | | | | |
| Dry Tensile Strength (lb/3 in) | 106 | 133 | 121 | 126 | 134 |
| Elongation (%) | 4.06 | 5.02 | 5.05 | 5.10 | 5.19 |
| Basis weight | 1.8 | 1.8 | 1.8 | 1.8 | 1.8 |
| Elmendorf tear strength (gf) | 551 | 651 | 561 | 523 | 541 |
| % LOI | 22.0 | 22.2 | 21.8 | 21.7 | 21.9 |
| % Hot-Wet Retention | 61 | 68 | 72 | 77 | 66 |
| ETN | 161 | 228 | 222 | 246 | 226 |

TABLE 3-continued

|  | Ex. 13 | Ex. 14 | Ex. 15 | Ex. 16 | C. Ex. 10 |
|---|---|---|---|---|---|
| POLYMER ADDITIVE AND CURE TIME | | | | | |
| Polymer additive | BF-L38 | BF-L38 | BF-L38 | BF-L38 | BF-L38 |
| Cure time (seconds) | 35 | 40 | 45 | 50 | 60 |
| PROPERTIES | | | | | |
| Dry Tensile Strength (lb/3 in) | 92 | 116 | 136 | 125 | 103 |
| Elongation (%) | 3.77 | 4.55 | 5.12 | 4.78 | 4.49 |
| Basis weight | 1.8 | 1.8 | 1.8 | 1.8 | 1.8 |
| Elmendorf tear strength (gf) | 381 | 448 | 531 | 505 | 561 |
| % LOI | 21.9 | 22.3 | 22.7 | 22.1 | 22.3 |
| % Hot-Wet Retention | 72 | 74 | 66 | 86 | 81 |
| ETN | 165 | 210 | 215 | 266 | 205 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. An aqueous binder composition for use in making fiber mats, the binder composition comprising:
   a urea-formaldehyde resin; and
   an aqueous emulsion of a copolymer prepared by polmerization of a mixture comprising about 20 wt % to about 60 wt % styrene, about 20 wt % to about 50 wt % of an alkyl (meth)acrylate, about 5 wt % to about 30 wt % acrylonitrile, and about 1 wt % to about 15 wt % of an unsubstituted or substituted acrylamide, where all weight percents are based on a total weight of the mixture.

2. The aqueous binder composition of claim 1, wherein the alkyl (meth)acrylate is a $C_1$-$C_6$ alkyl (meth)acrylate.

3. The aqueous binder composition of claim 1, wherein the alkyl (meth)acrylate comprises butyl acrylate.

4. The aqueous binder composition of claim 1, wherein the alkyl (meth)acrylate comprises ethyl acrylate.

5. The aqueous binder composition of claim 1, wherein the unsubstituted or substituted acrylamide is selected from the group consisting of acrylamide, methacrylamide, N-methylolacrylamide, N-methylolmethacrylamide, and mixtures thereof.

6. The aqueous binder composition of claim 1, wherein the unsubstituted or substituted acrylamide comprises acrylamide and N-methylolacrylamide.

7. The aqueous binder composition of claim 1, wherein the mixture further comprises a silane monomer comprising at least one polymerizable carbon-carbon double bond and at least one hydrolyzable group.

8. The aqueous binder composition of claim 7, wherein the silane monomer is selected from the group consisting of gamma-methacryloxypropyltriethoxysilane, beta-methacryloxyethyltrimethoxysilane, beta-methacryloxyethyltriethoxysilane, beta-methacryloxyethylmethyidimethoxysilane, beta-methacryloxyethylmethyidiethoxysilane, beta-methacryloxyethyldimethoxysilane, beta-methacryloxyethyldimethylethoxsilane, beta-methacryloxyethylyrichlorosilane, gamma-methacryloxypropyltrimethoxysilane, gamma-methacryloxpropylmethyldimethoxysilane, gamma-methacryloxypropylmethyldiethoxysilane, gamma-methacryloxypropyldimethoxysilane, gamma-methacryloxpropyldimethylethoxysilane, beta-acryloxethyltrimethoxysilane, beta-acryloxyethyltriethoxysilane, beta-acryloxyethylmethyidimethoxysilane, beta-acryloxyethylmethyidiethoxysilane, beta-acryloxyethyldimethylmethoxysilane, beta-acryloxyethyldimethylethoxysilane, beta-acryloxyethyltrichlorosilane, gamma-acryloxypropyltrimethoxysilane, gamma-acryloxypropylmethyldimethoxysiane, gamma-acryloxypropylmethyldiethoxysilane, gamma-acryloxpropyldimethylmethoxysilane, gamma-acryloxypropyldimethylethoxysilane, beta-styrylethyltrimethoxysilane, vinyltriacetoxysilane, vinylethoxydimethoxysilane, vinylmethyldimethoxysilane, vinylmethyldiethoxysilane, vinyltris(2-methoxyethoxy)silane, and mixtures thereof.

9. The aqueous binder composition of claim 7, wherein the silane monomer comprises gamma-methacryloxypropyltriethoxysilane.

10. The aqueous binder composition of claim 1, wherein the mixture further comprises poly(vinyl alcohol).

11. The aqueous binder composition of claim 1, wherein the mixture further comprises starch.

12. The aqueous binder composition of claim 1, wherein the mixture further comprises a crosslinking monomer comprising at least two polymerizable carbon-carbon double bonds.

13. The aqueous binder composition of claim 1, wherein the mixture is free of maleic anhydride.

14. The aqueous binder composition of claim 1, wherein the mixture is free of butadiene.

15. The aqueous binder composition of claim 1, further comprising poly(styrene-maleic anhydride).

16. The aqueous binder composition of claim 1, wherein the composition is free of poly(styrene-maleic anydride).

17. The aqueous binder composition of claim 1, wherein the mixture further comprises itaconic acid, gamma-methacryloxpropltriethoxysilane, and a crosslinking monomer, wherein the alkyl (meth)acrylate comprises butyl acrylate and the unsubstituted or substituted acrylamide comprises acrylamide and N-methylolacryiamide, and wherein the mixture comprises about 30 wt % to about 60 wt % styrene, about 20 wt % to about 40 wt % butyl acrylate, about 10 wt % to about 25 wt % acrylonitrile, about 0.5 wt % to about 4 wt % acrylamide, about 1 wt % to about 6 wt % N-methylolacrylamide, about 0.1 wt % to about 3 wt % itaconic acid, about 0.1 wt % to about 3 wt % gamma-methacryloxpropyltriethoxysilane, and about 0.2 wt % to about 4 wt % of the crosslinking monomer, where all weight percents are based on the total weight of the mixture.

18. The aqueous binder composition of claim 1, where the mixture further comprises itaconic acid, gamma-methacryloxpropylthriethoxysilane, a crosslinking monomer, and poly(vinyl alcohol), wherein the alkyl (meth)acrylate comprises butyl acrylate and the unsubstituted or substituted acrylamide comprises acrylamide and N-methylolacrylarnide, and wherein the mixture comprises about 30 wt % to about 60 wt % styrene, about 20 wt % to about 40 wt % butyl acrylate, about 10 wt % to about 25 wt % acrylonitrile, 0.5 wt % to about 4 wt % acrylamide, about 1 wt % to about 6 wt % N-methylolacrylamide, about 0.1 wt % to about 3 wt % itaconic acid, about 0.1 wt % to about 3 wt % gamma-methacryloxypropyltriethoxysilane, about 0.2 wt % to about 4 wt % of the crosslinking monomer, and about 5 wt % to about 20 wt % poly(vinyl alcohol), where all weight percents are based on the total weight of the mixture.

19. The aqueous binder composition of claim 1, where the mixture further comprises itaconic acid, a crosslinking monomer, and starch, wherein the alky (meth)acrylate comprises ethyl acrylate and the unsubstituted or substituted acrylamide comprises acrylamide and N-methylolacrylamide, and wherein the mixture comprises about 40 wt % to about 60 wt % ethyl acrylate, about 20 wt % to about 40 wt % styrene, about 5 wt % to about 20 wt % acrylonitrile, about 0.2 wt % to about 3 wt % acrylamide, about 1 wt % to about 6 wt % N-methylolacrylamide, about 0.1 wt% to about 3 wt % itaconic acid, about 0.2 wt % to about 4 wt % of the crosslinking monomer, and about 5 wt % to about 20 wt % starch, where all weight percents are based on the total weight of the mixture.

20. A non-woven fiber mat, comprising:
reinforcing fibers; and
a cured product of a curable binder composition comprising:
   a urea-formaldehyde resin; and
   an aqueous emulsion of a copolymer prepared by polymerization of a mixture comprising about 20 wt % to about 60 wt % styrene, about 20 wt % to about 50 wt % of an alkyl (meth)acrylate, about 5 wt % to about 30 wt % acrylonitrile, and about 1 wt % to about 15 wt % of an unsubstituted or substituted acrylamide, where all weight percents are based on a total weight of the mixture.

21. The non-woven fiber mat of claim 20, wherein the reinforcing fibers are glass fibers.

22. A fiber mat faced gypsum wall board, comprising:
a gypsum core having a planar first face and a planar second face; and
a coated non-woven glass fiber mat facing material adhered to and covering at least one of the planar first face and the planar second face;
wherein the non-woven glass fiber mat facing material comprises a coating comprising a cured product of a curable binder composition comprising:
   a urea-formaldehyde resin; and
   an aqueous emulsion of a copolymer prepared by polymerization of a mixture comprising about 20 wt % to about 60 wt % styrene, about 20 wt % to about 50 wt % of an alkyl (meth)acrylate, about 5 wt % to about 30 wt % acrylonitrile, and about 1 wt % to about 15 wt % of an unsubstituted or substituted acrylamide, where all weight percents are based on a total weight of the mixture.

* * * * *